(12) United States Patent
Jiang et al.

(10) Patent No.: US 8,275,604 B2
(45) Date of Patent: Sep. 25, 2012

(54) ADAPTIVE PATTERN LEARNING FOR BILINGUAL DATA MINING

(75) Inventors: Long Jiang, Beijing (CN); Shiquan Yang, Chongqing (CN); Ming Zhou, Beijing (CN); Xiaohua Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 859 days.

(21) Appl. No.: 12/406,722

(22) Filed: Mar. 18, 2009

(65) Prior Publication Data

US 2010/0241416 A1    Sep. 23, 2010

(51) Int. Cl.
*G06F 17/20* (2006.01)
*G06F 17/28* (2006.01)
*G10L 11/00* (2006.01)
*G06F 17/21* (2006.01)
*G10L 21/00* (2006.01)

(52) U.S. Cl. ....... 704/4; 704/2; 704/9; 704/10; 704/270; 704/277

(58) Field of Classification Search .......... None
See application file for complete search history.

(56) References Cited

U.S. PATENT DOCUMENTS

| 7,249,012 | B2 | 7/2007 | Moore |
| 7,340,388 | B2 | 3/2008 | Soricut et al. |
| 2004/0261021 | A1 | 12/2004 | Mittal et al. |
| 2007/0011132 | A1 | 1/2007 | Zhou et al. |
| 2008/0126076 | A1 | 5/2008 | Ming et al. |

OTHER PUBLICATIONS

Chia-Hui Chang, Chun-Nan Hsu, and Shao-Cheng Lui. 2003. Automatic information extraction from semi-structured Web pages by pattern discovery. Decis. Support Syst. 35, 1 (Apr. 2003), 129-147. DOI=10.1016/S0167-9236(02)00100-8 http://dx.doi.org/10.1016/S0167-9236(02)00100-8.*

Masatsugu Tonoike, Mitsuhiro Kida, Toshihiro Takagi, Yasuhiro Sasaki, Takehito Utsuro, and Satoshi Sato. 2006. A comparative study on compositional translation estimation using a domain/topic-specific corpus collected from the web. In Proceedings of the 2nd International Workshop on Web as Corpus (WAC '06). Association for Computational Linguistics.*

Cao et al., "A System to Mine Large-Scale Bilingual Dictionaries from Monolingual Web Pages", MT Summit, 2007, pp. 57-64.

Chang et al., "IEPAD: Information Extraction Based on Pattern Discovery", Proceedings 10th ACM WWW Conf, 2001, 8 pgs.

Cheng et al., "Translating Unknown Queries with Web Corpora for Cross-Language Information Retrieval", Proceedings of SIGIR204, Jul. 2004, pp. 162-169.

(Continued)

*Primary Examiner* — Justin Rider
(74) *Attorney, Agent, or Firm* — Lee & Hayes, PLLC

(57) ABSTRACT

Embodiments for the adaptive learning of translation layout patterns to mine bilingual data are disclosed. In accordance with at least one embodiment, the adaptive learning of patterns to mine bilingual data includes processing a bilingual web page into a Document Object Model (DOM) tree. The embodiment further includes linking the bilingual snippet pairs of each node into a plurality bilingual snippet pairs. The embodiment also includes determining one or more best fit candidate patterns based on the plurality of translation snippets via a Support Vector Machine classifier. The embodiment additionally includes mining one or more translation pairs from the bilingual web page using the one or more best fit candidate patterns. The translation pairs are further stored in a data storage. The one or more translation pairs including at least one of a term pair, a phrase pair, or a sentence pair.

20 Claims, 8 Drawing Sheets

OTHER PUBLICATIONS

Fung et al., "An IR Approach for Translating New Words from Nonparallel, Comparable Texts", COLLING-ACL, 1998, pp. 414-420.

Huang et al., "Mining Key Phrase Translations from Web Corpora", Proceedings of HLT-EMNLP2005, 2005, 8 pgs.

Jiang et al., "Named Entity Translation with Web Mining and Transliteration", Proceedings 20th IJCAI-07, 2007, pp. 1629-1634.

Li, et al., "Study on Word Alignment for Reordering of Web-mined OOV Translation Candidates", retrieved on Jan. 5, 2009 at <<http://www.atlantis-press.com/php/download_paper.php?id=1770>>, Proceedings of the 11th Joint Conference on Information Sciences, Atlantis Press, 2008, pp. 1-6.

Lin et al., "Mining Parenthetical Translations from the Web by Word Alignment", Proceedings ACL-08, Jun. 2008, pp. 994-1002.

Lu et al., "Anchor Text Mining for Translation of Web Queries: A Transitive Translation Approach", ACM Transactions on Information Systems, vol. 22, No. 2, Apr. 2004, pp. 242-269.

Marcu et al., "A Phrase-Based, Joint Probability Model for Statistical Machine Translation", Proceedings EMNLP, 2002, pp. 133-139.

Nagata, "Using the Web as a Bilingual Dictionary", retrieved on Jan. 5, 2009 at <<http://www.aclweb.org/anthology-new/W/W01/W01-1413.pdf>>, 9 pages.

Nie et al., "Cross-Language Information Retrieval Based on Parallel Texts and Automatic Mining of Parallel Text from the Web", SIGIR 1999, pp. 74-81.

Shao et al., "Mining New Word Translations from Comparable Corpora", In Proc of Coling 2004, pp. 618-624.

Shi et al., "A DOM Tree Alignment Model for Mining Parallel Data from the Web", Proceedings 21st Intl Conf on Computational Linguistics and 44th Annual mtg ACL 2006, 8 pgs.

Shin et al., "Bilingual Knowledge Acquisition from Korean-English Parallel Corpus Using Alignment Method: Korean-English Alignment at Word and Phrase Level", Proceedings of 16th Conf Computational Linguistics, Aug. 1996, 6 pgs.

Wang, et al., "Translating Unknown Cross-Lingual Queries in Digital Libraries Using a Web-based Approach", retrieved on Jan. 5, 2009 at <<http://wkd.iis.sinica.edu.tw/~lfchien/publication/jcdl04.pdf>>, JCDL, ACM, 2004, 9 pages.

Wu et al., "Learning Source-Target Surface Patterns for Web-Based Terminology Translation", ACL Interactive Poster and Demonstration Sessions, 2005, pp. 37-40.

Zhang et al., "Using the Web for Automated Translation Extraction in Cross-Language Information Retrieval", Proceedings of SIGIR 2004, pp. 162-169.

* cited by examiner

ADAPTIVE PATTERN LEARNING FOR BILINGUAL DATA MINING

BACKGROUND

Many multi-lingual applications, such as machine translation or cross-language information retrieval software, require bilingual lexicon to produced desired translation results. However, manually compiled bilingual dictionaries are often inadequate to serve this purpose due to their limited coverage. For example, machine translation or cross-language information retrieval software may be unable to correctly translate a first term written in a first language to a second term of the same meaning in a second language due to the fact that the first term is not in the presently used bilingual dictionary. Such terms may be referred to as Out-Of-Vocabulary (OOV) terms. These OOV terms may severely deteriorate the quality of a machine translated document, or drastically hinder the ability of cross-language information retrieval software to retrieve relevant data.

With a sharp increase of bilingual pages (web pages with content in two or more languages), web mining of term or sentence translations, that is, a term or sentence in a first language proximately located to a translation of the term or sentence in a second language, can greatly alleviate this problem. In some instances, some web mining methods may manually define a set of pattern rules to extract term or sentence translations from web pages, as layout patterns of term translations on a single web page tend to occur in similar patterns. For example, a parenthetical pattern, where a first term in a first language is followed by a second term in a second language in parenthesis, may be used to extract term translations from bilingual web pages that implement such a pattern rule.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various technologies for adaptively learning translation layout patterns for extracting bilingual translations from bilingual web pages. A major problem with web mining methods that are not capable of adaptively learning translation layout pattern, but which instead rely on fixed pattern rules, is that term translations may vary from web page to web page, so that the use of a fixed set of pattern rules cannot cover all bilingual web pages.

The various embodiments may regard bilingual translation mining on a bilingual web page as pattern-based mining of a Document Object Model (DOM) tree. Such embodiments may be adapted to extract bilingual translations from bilingual web pages that implement different translation layout patterns. For example, but not as a limitation, the embodiments may be used to extract translations from both a first bilingual page that provides an English-Spanish bilingual translation pair in the layout pattern of "Hello (Hola)" and a second bilingual page that provides the same translation in the layout pattern of "Hello: Hola." In this way, the extraction technologies in accordance with the embodiments may accommodate multiple extraction patterns present in the different bilingual web pages. Thus, the manual definition of bilingual translation pattern rules for the purpose of bilingual translation extraction may be avoided.

In at least one embodiment, the adaptive learning of translation layout patterns to mine bilingual data includes processing a bilingual web page into a Document Object Model (DOM) tree. The embodiment further includes linking the bilingual snippet pairs of each node into a plurality of bilingual snippet pairs. The at least one embodiment also includes determining one or more best fit candidate patterns based on the plurality of translation snippets via a Support Vector Machine classifier. The at least one embodiment additionally includes mining one or more translation pairs from the bilingual web page using the one or more best fit candidate patterns. The translation pairs are further stored in a data storage. The one or more translation pairs include at least one of a term pair, a phrase pair, or a sentence pair.

Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to a translation mining application that adaptively learns bilingual translation layout patterns for the extraction of bilingual translations from bilingual web pages on the World Wide Web, also referred to herein as the "Web", or other networked data storage locations. As used herein, "bilingual web page" refers to a web page that includes words in at least two different languages (e.g., a predominately Chinese web page that is interlaced with English words). However, "bilingual web page", as used herein, may also include a web page that comprises words in more than two languages, provided that the web page includes words in at least two languages of interest (e.g., a predominately Chinese web page that is interlaced with both English and French words).

The multi-language words in the bilingual web pages may be organized into the form of translation pairs. In some instances, a translation pair may be a pair of terms that consists of a first language term, and a corresponding second language term that has the same or similar meaning. For example, "Hello (Hola)" is a translation pair, where "Hello" is in the first language (English), and "Hola" is in the second language (Spanish). In another example, "Goodbye: Au revoir" is another translation pair, where "Goodbye" is in the first language (English), and "Au revoir" is in the second language (French). In other instances, a translation pair may be a pair of phrases or sentences consisting of multiple first language words forming a first sentence or phrase, and corresponding multiple second language words forming a second sentence or phrase. For example, "What is new? 有什么新鲜事?" is also a translation pair, in which "What is new?" is in the first language (English), and "有什么新鲜事?" is in the second language (Chinese).

The various embodiments described herein may regard bilingual translation mining from a bilingual web page as pattern-based mining of a Document Object Model (DOM) tree. Thus, the ability to adaptively learn bilingual data layout patterns may provide the ability to extract bilingual translations from a variety of bilingual web pages, regardless of the layout patterns employed for the translation pairs, and eliminate the need to manually determine and define pattern rules. Various examples of adaptive learning of bilingual data layout patterns for the extraction of bilingual translation pairs from bilingual we pages in accordance with the embodiments are described below with reference to FIGS. 1-8.

Exemplary Scheme

Figure 1:
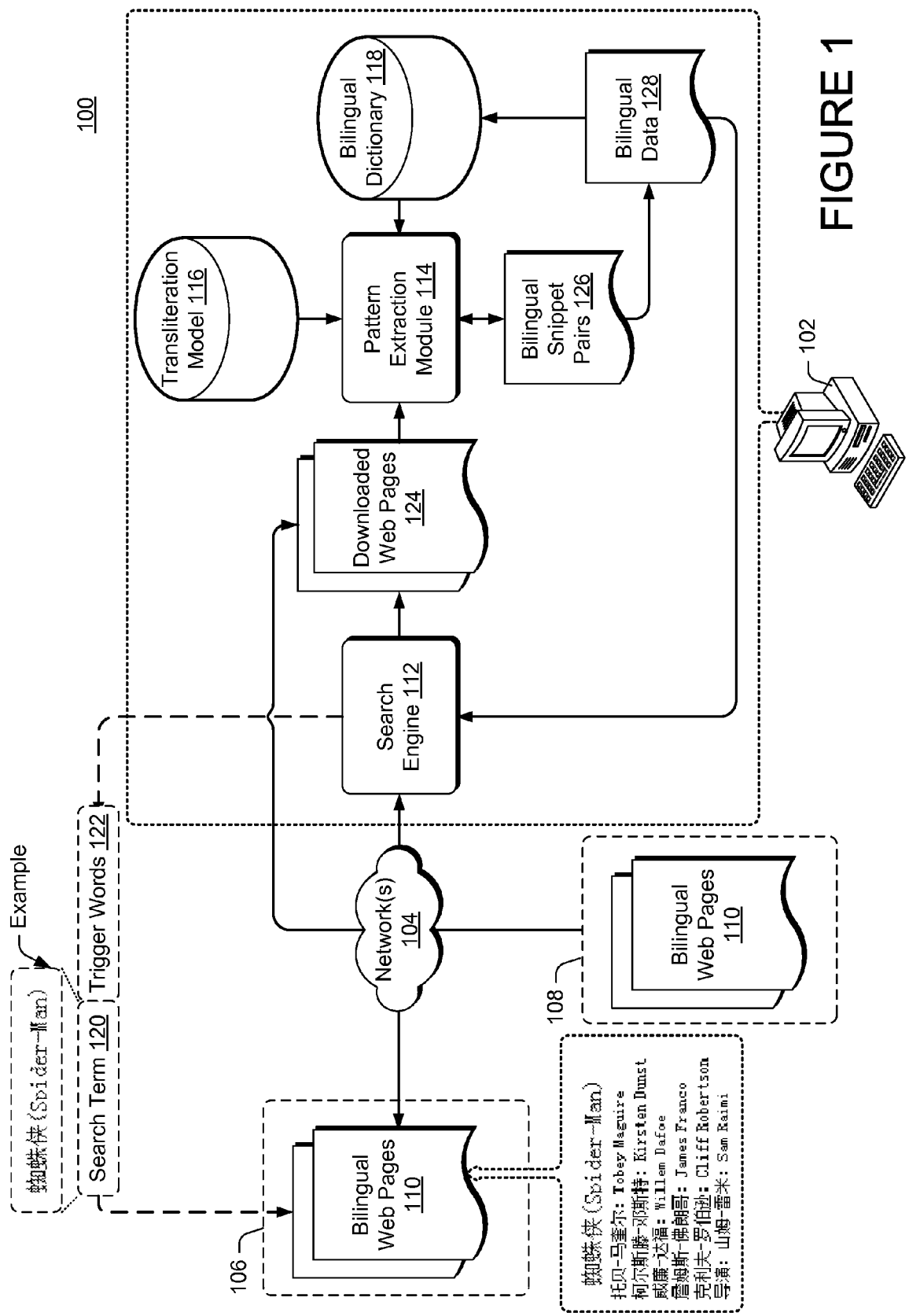
FIG. 1 shows a block diagram that illustrates a computing environment for bilingual data mining based on adaptive pattern learning, in accordance with various embodiments.

FIG. 1 illustrates a computing environment 100 for bilingual data mining based on adaptive pattern learning, in accordance with various embodiments. The computing environment 100 may include a computing device 102. The computing device 102 may be any computing device that has network access capabilities, e.g., a desktop computer, a laptop computer, a tablet computer, mobile phone, etc. In turn, the computing device 102 is connected to one or more networks 104. The one or more networks 104 may include at least one of wide-area networks (WANs), local area networks (LANs), and/or other network architectures, that connect the computing device 102 to the World Wide Web 106. However, it will be appreciated that in other embodiments, the one or more network 104 may also connect the computing device 102 to any networked data storage location 108 where bilingual web pages 110 are stored (e.g., bilingual web page document collection on a server).

The computing device 102 may include software application components such as a search engine 112, a pattern extraction module 114, a transliteration model 116, and a bilingual dictionary 118, wherein the components perform bilingual data mining.

In various embodiments, the search engine 112 may use the network 104 to transmit a query to the Web 106, whereby the query is for bilingual web pages 110 that contain the search term 120. For example, but not as a limitation, a user may provide a query that includes the actor name "Tobey Maguire" as the search term 120 when the user desires to find bilingual web pages related to the actor "Tobey Maguire".

In other embodiments, the search term 120 may be a translation pair that includes terms in two different languages. In this way, the use of such a bilingual translation pair may trigger the search engine 108 to focus the search on web pages with bilingual content. A search term 120 that is a Chinese-English translation pair for the English movie title "Spider-Man" is illustrated in FIG. 1.

In additional embodiments, the search term 120 may be paired with trigger words 122. The trigger words 122 are words that may trigger the search engine 106 to specifically include bilingual web pages 110 in queries. For example, but not as a limitation, when the search engine 108 is used to query the Web 106 for a Chinese translation of the English name (search term) "Tobey Maguire", the user who initiates the query may include the trigger words "English and Chinese translation" to better target the query to look for bilingual web pages 110 that include bilingual translation content related to the actor "Tobey Maguire" (shown in FIG. 1). However, it will be appreciated that a search term query, as well as the supplement of a search term with trigger words, may be carried out in any language to achieve the desired result.

The search engine 108 may find one or more bilingual web pages 110 that match the query that includes search term 120 and optionally, the trigger words 122. Subsequently, the search engine 108 may retrieve the one or more bilingual web pages 110 over the network 104 as downloaded web pages 124. In various embodiments, the one or more retrieved bilingual web pages may be downloaded to a data storage cache of the computing device 102.

In additional embodiments, a variety of bilingual web pages 110 may be downloaded onto the computing device 102 via the network 104. In some of these embodiments, the user who initiates the query may include trigger words 122 to search for a particular type of bilingual web page using the search engine 108. For example, but not as a limitation, the user may input "English and Chinese translation" or "English and French translation" to acquire the desired bilingual web pages. The one or more retrieved bilingual web pages may be downloaded to the data storage cache of the computing device 102.

In other of these embodiments, bilingual web pages may be selected for download to the data storage cache of the computing device 102 based on other pre-selected criteria. In at least one embodiment, the computing device 102 may download web pages from one or more web sites that are known to generally have bilingual content (e.g., international new media web sites, entertainment sites, etc.). In another embodiment, the search engine 108 may be a web crawler that automatically downloads web pages from web sites that have a particular country code top level domain (e.g., .cn, .jp, .kr, etc.). Such predominately non-English web sites, as indicated by their respective country code top level domain, tend to frequently contain English terms and native language translations for the English terms. The computing device 102 may download such pre-selected bilingual web pages on a regular interval (e.g., on a weekly basis), on a continuous basis, and/or upon the command of the user. In still other embodiments, the computing device 102 may use the network 104 to download bilingual web pages 110 from a networked data storage location 108 where the bilingual web pages 110 are stored (e.g., bilingual web page document collection on a server).

Following download, the pattern extraction module 114 may process each of the downloaded web pages 124 into a Document Object Model (DOM) tree, in which the nodes of DOM tree include bilingual inner texts. The pattern extraction module 114 may further identify bilingual snippet pairs 126 from the bilingual inner texts of the DOM tree nodes. In various embodiments, the pattern extraction module 114 may use the transliteration model 116 and the appropriate bilingual dictionary 118 to identify the bilingual snippet pairs 126.

Following the identification of the bilingual snippet pairs 126, the pattern extraction module 114 may acquire one or more translation layout patterns of the bilingual snippet pairs 126. Based on the one or more acquired translation layout patterns, the pattern extraction module 114 may extract bilingual data 128 from the processed downloaded web page 124. The bilingual data 128 may include all translation pairs in the processed downloaded web page 124. In various embodiments, the translation pairs may include at least one of a term pair, a phrase pair, or a sentence pair.

In some embodiments, the bilingual data 128, which may include all translation pairs in the downloaded web page 124, may be stored in the bilingual dictionary 118 for the identification of bilingual data 128 in additional downloaded web pages 124.

In further embodiments, the computing device 102 may be configured to further provide the bilingual data 128 back into the search engine 108 as the search term 120 to query for new bilingual web pages 110. The use of bilingual data 128 as the search term 120 may lead to additional bilingual web pages 110.

Exemplary Components

Figure 2:
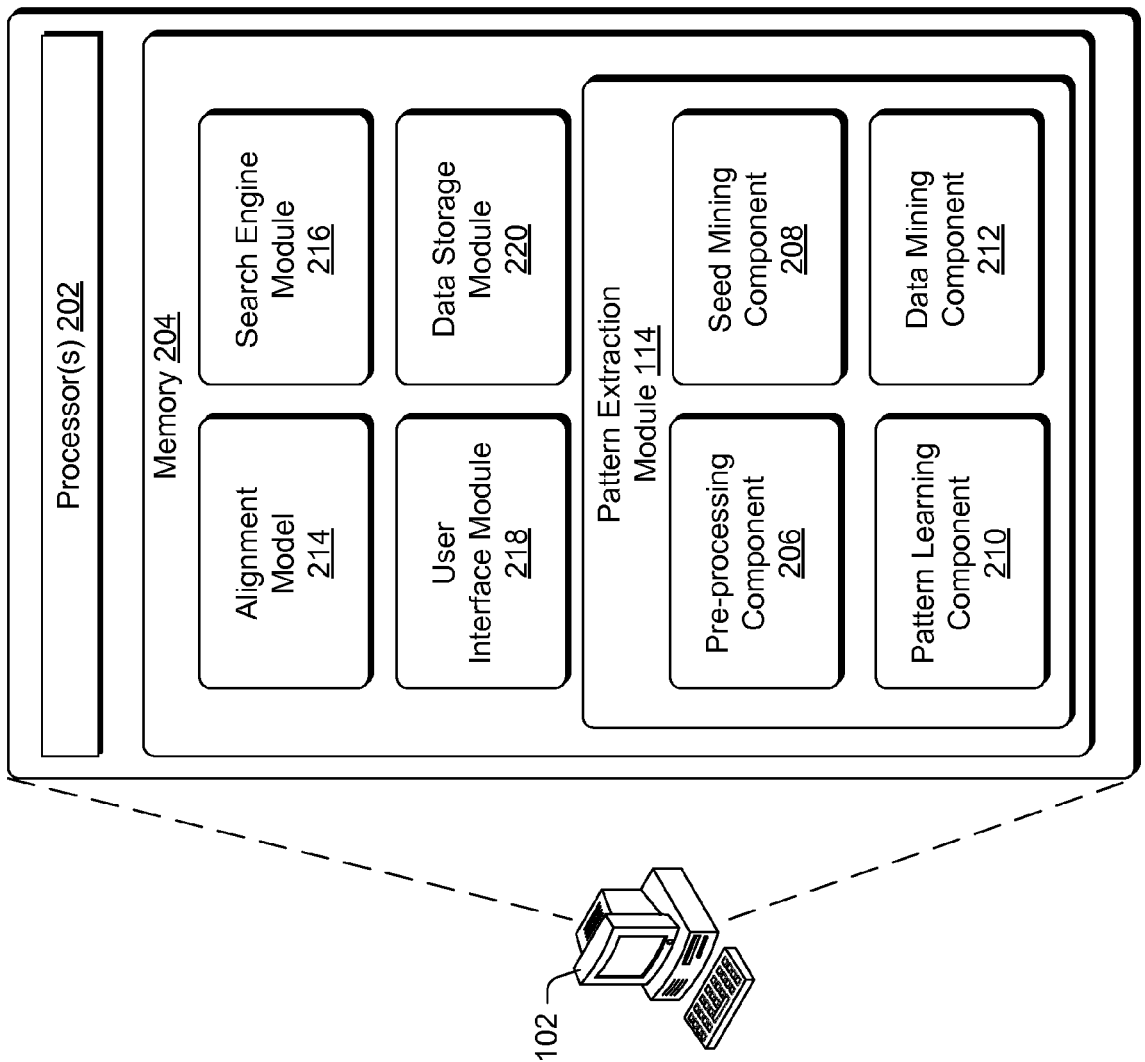
FIG. 2 shows a block diagram that illustrates selected components of one example of a computer device that includes a pattern extraction module, in accordance with various embodiments.

FIG. 2 illustrates selected components of one example of computer device 102 that include a pattern extraction module 114, in accordance with various embodiments. The computing device 102 may include one or more processors 202 and memory 204. The memory 204 may include volatile and/or nonvolatile memory, removable and/or non-removable media implemented in any method or technology for storage of information, such as computer-readable instructions, data structures, program modules or other data. Such memory 204 may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 204 may store program instructions. The program instructions, or modules, may include routines, programs, objects, components, and data structures that cause components of computer 102 to perform particular tasks or implement particular abstract data types. The selected program instructions may include a pattern extraction module 114 that includes a pre-processing component 206, a seed mining component 208, a pattern learning component 210, and a data mining component 212. The selected program instructions may further include an alignment model 214, a search engine module 216, a user interface module 218, and a data storage module 220.

The various modules of the computing device 102 may be configured to perform translation pair extraction. Translation pair extractions are predominately described below with respect to Chinese-English bilingual web pages. However, it will be appreciated that the various modules of computing device 102 may be configured to perform bilingual translation extraction on a variety of other bilingual web pages, where the bilingual web pages include a first language text and interlaced terms in a second language. For example, but not as a limitation, these other bilingual web pages may include bilingual web pages that are English and Spanish, and English and Korean, as well as other bilingual combinations.

The pre-processing component 206 may be configured to process each input web page (e.g., HyperText Markup Language (HTML) document), such as one of the downloaded bilingual web pages 122 (FIG. 1), into a Document Object Model (DOM) tree. DOM is an application programming interface for parsing HTML documents. With the use of DOM, an HTML document may be parsed into a tree structure, by which each node of the DOM tree structure belongs to a pre-defined type (e.g., DIV, TABLE, TEXT, COMMENT, etc.). Following the processing of an input bilingual web page into a DOM tree, the pre-processing component 206 may remove nodes having certain attribute information, or certain attribute nodes, as such nodes control visual appearance rather than provide actual content. For example, but not as a limitation, the attribute nodes may include nodes that contain presentational structural and/or hypertext information, such as one or more of "<B>", "<I>", "<U>", "<STRONG>", "<EM>", "<PRE>", "<FONT>", "<A>", and the like. Subsequent to the removal of the attribute nodes, the pre-processing component 206 may connect the children content nodes of the attribute nodes directly to one or more parent nodes (e.g., <html> node). The removal of attribute nodes and the connection of children content nodes to one or more parent nodes are shown in FIG. 3.

Figure 3:
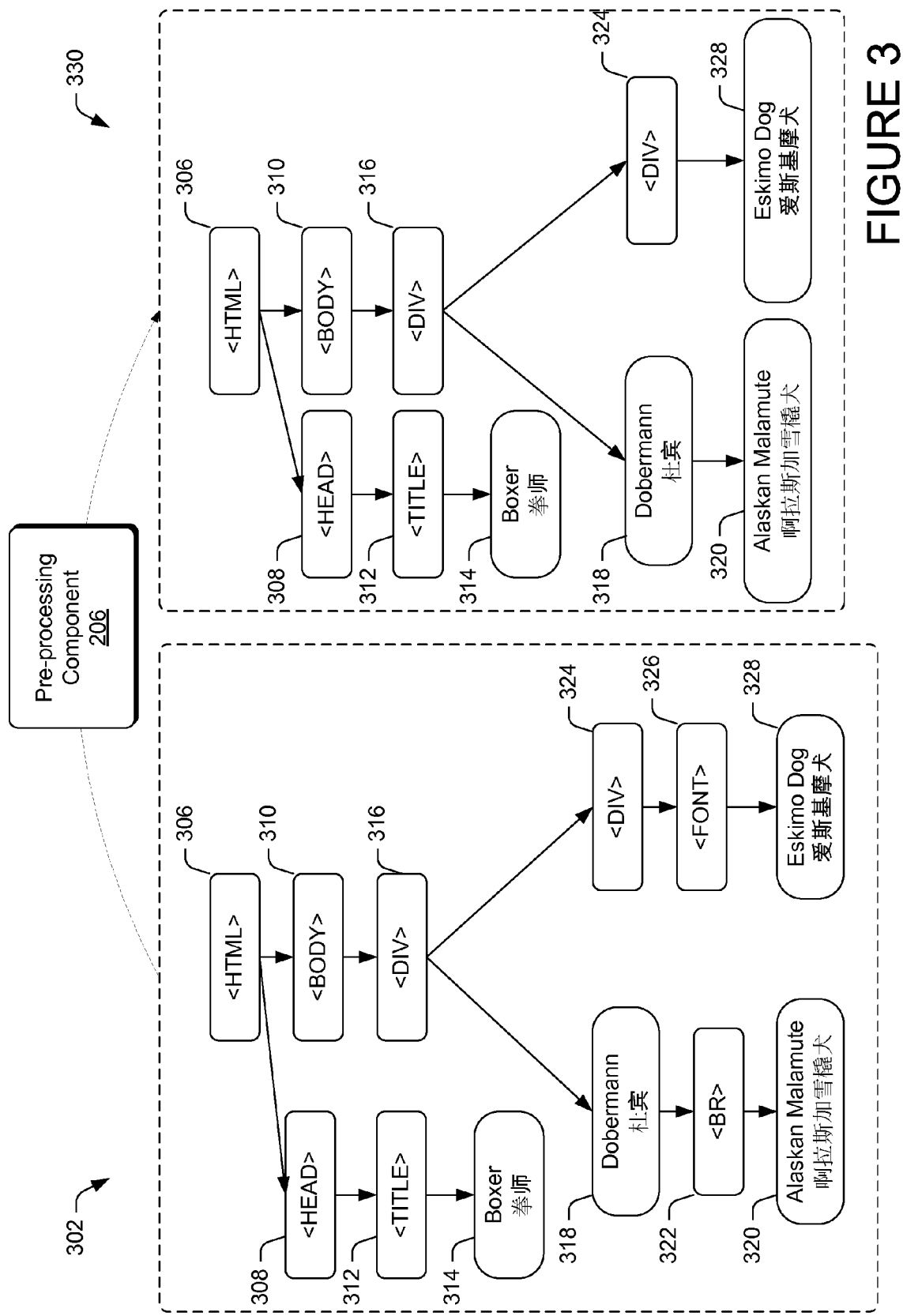
FIG. 3 illustrates an exemplary removal of attribute nodes of a Document Object Model (DOM) tree and the connection of children content nodes to one or more parent nodes by a pattern extraction module, in accordance with various embodiments.

FIG. 3 illustrates an exemplary removal of attribute nodes of a Document Object Model (DOM) tree 302 and the connection of children content nodes to one or more parent nodes, in accordance with various embodiments. In the example shown, the DOM tree 302 may include a <html> node 306. The <html> root node 306, in turn, may include a plurality of children attribute nodes. As shown, the <html> node 306 may include a child <head> node 308 and a child <body> node 310. The <head> node 308 may further include a child <title> node 312, which includes a child content node 314. The child content node 314 may hold inner text, e.g., "Boxer" and its corresponding Chinese translation.

Likewise, the <body> node 310 may further include a first child <div> node 316. The first child <div> node 316 may further include a child content node 318 that may hold inner text, e.g., "Dobermann" and its corresponding Chinese translation. The first child <div> node 316 may also include a child content node 320 that holds inner text, e.g., "Alaskan Malamute" and its corresponding Chinese translation. The child content node 318 and the child content node 320 may be separated by a <br> node 322.

The first child <div> node 316 may additionally include a second child <div> node 324. The second child <div> node 324 may further include a child <font> node 326. Finally, the child <font> node 326 may include a child content node 328 that holds inner text, e.g., "Eskimo Dog" and the corresponding Chinese translation of the name phrase.

In various embodiments, the pre-processing component 206 may remove the certain attribute nodes (e.g., <br> node, <font> node) of the DOM tree 302 to produce the DOM tree 330. As shown, the DOM tree 330 includes may be include similar nodes that are arranged in a similar hierarchy as the DOM tree 302, except that the <br> node 322 and the <font> node 326 have been removed by the pre-processing component 206.

Returning to FIG. 2, following the parsing of the bilingual input web page into a DOM tree, the pre-processing component 206 may further segment the inner text in each node of the DOM tree into a list of text snippets according to different languages. For example, in the instance where the bilingual input web page includes English and Chinese, each of the snippets in each node will be labeled as either an English snippet, or a Chinese snippet.

In various embodiments, the pre-processor 206 may segment the inner text in each node based on the Unicode value of the characters that make up the inner text, and further based on a set of segmentation rules. The Unicode value may serve to distinguish the characters that make up the inner text since characters of different languages are identifiable based on their Unicode value. In at least one embodiment, the segmentation rules may dictate that an open punctuation, such as "(", will be included into a subsequent snippet, and close punctuation, such as ")", will be included in a preceding snippet. The segmentation rules may also dictate that other punctuation marks, (e.g., semi-colon) may be included into a preceding snippet. For example, given the inner text "Hello (Hola)", where "Hello" is the preceding snippet and "Hola" is the subsequent snippet, the "(" in front of "Hola" will be include with "Hola" to form the snippets "Hello" and "(Hola)." However, given the inner text "(Hello) Hola", where "Hello" is the preceding snippet and "Hola" is the subsequent snippet, the ")" following "Hello" will be include with "Hello" to form the snippets "(Hello)" and "Hola."

In additional embodiments, the segmentation rules may dictate that an English snippet that is only one or two ASCII letters will be merged with either a preceding snippet of a different language, or the subsequent snippet of a different language, if it exists. This is due to the fact that sometimes a non-English sentence (e.g., Chinese sentence) may include some abbreviations in English.

Since a node's inner text may include all inner texts of its children, the segmentation to all texts of a DOM tree, such as the DOM tree 302, has to be performed from the leaf nodes, that is, child nodes that do not have additional child nodes, up to the root (e.g., <html> node 306) in order to avoid repetitive work. When segmenting a node's inner text, the pre-processing component 206 may first segment the texts immediately dominated by this node and then combine those results with its children's segmented inner texts in sequence. As a result of the segmentation, for example, the inner text of every node that contains Chinese and English snippets may look like " . . . ECECCEC . . . ", where each "E" represents an English snippet, and each "C" represents a Chinese snippet. In other words, adjacent snippets in the same language only appear in the inner texts of some non-leaf nodes after the combination of their children's snippets.

Following segmentation by the pre-processing component 206, the pre-processing component 206 may further designate each snippet according to its language. For example, in the instance where the inner text of a node includes Chinese and English snippets, the snippets may be alternatively labeled as "E" for the English snippet, and "C" for the Chinese snippet. Accordingly, in such an example, inner text that includes a single English snippet that is followed by an adjacent corresponding Chinese snippet may be transformed into the designation "EC". In another example where the inner text includes two "EC" pairings, the designation may be "ECEC". Thus, It will be appreciated that inner text that includes multiple "EC" pairs may be designated as " . . . ECEC . . . ", where the number of "EC"s is based on the number of English-Chinese pairs present in the inner text. The pairing of two snippets of two different languages, such as the "EC" pairing, may be referred to herein as a "bilingual snippet pair".

Figure 4:
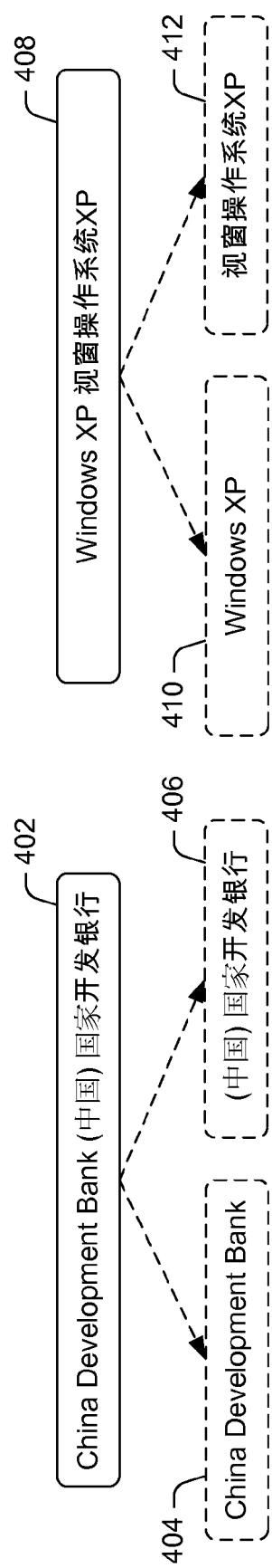
FIG. 4 illustrates exemplary segmentation of inner texts by a pre-processing component of a pattern extraction module, in accordance with various embodiments.

FIG. 4 illustrates exemplary segmentation of inner texts by the pre-processing component 206, in accordance with various embodiments. As shown, the inner text 402 of a content node may be segmented by the pre-processing component 206 into snippets 404 and 406. It will be appreciated that the segmentation of inner text 402 demonstrates the application of the segmentation rule that an open punctuation, such as "(", will be included into a subsequent snippet.

Moreover, the inner text 408 of another content node may be segmented by the pre-processing component 206 into snippets 410 and 412. It will be appreciated that the segmentation of inner text 408 demonstrates the application of the segmentation rule that an English snippet that is only one or two ASCII letters will be merged with a subsequent snippet of a different language.

The pre-processing component 206 may be further configured to eliminate bilingual web pages that contain nodes with insufficient pairs of bilingual snippets. This is due to the fact that additional processing by other components of the pattern extraction module 114, such as the seed mining component 208, generally depends on the presence of a sufficient number of bilingual snippet pairs, such as bilingual snippet pairs 126 (FIG. 1) in a single node of a bilingual web page.

In various embodiments, the pre-processing component 206 may determine whether the DOM tree of a bilingual web page includes at least one "collective node". A "collective node" may be a node of the DOM tree whose inner text contains at least a minimum number of non-overlapping bilingual snippet pairs and less than a maximum percentage of other snippets that do not belong to any bilingual snippet pairs. In at least one embodiment, the minimum number of non-overlapping bilingual snippet pairs may be 10 pairs and the maximum percentage of other snippets may be 10 percent. However, it will be appreciated that the minimum number of non-overlapping bilingual snippet pairs and/or the maximum percentage of snippets that defines a "collective node" may vary in other embodiments. Such other embodiments may be implemented as long operations by the seed mining component 208, the pattern learning component 210, and/or the data mining component 212, as further described below, and may be performed on the bilingual web page having the defined "collective node."

Thus, referring back to FIG. 2, the pre-processing component 206 may verify that a particular bilingual web page includes at least one "collective node" by traversing the DOM tree of the bilingual web page with a breadth-first search (BFS) algorithm and creating a node array with all tree nodes according to the order in which they are visited by the BFS algorithm. The pre-processing component 206 may check each the inner text of each node in the node array in order (e.g., from the end of the array to the beginning of the array) to ascertain whether at least one of the nodes is a "collective node." If the pre-processing component 206 determines that the DOM tree of a particular bilingual web page does not include at least one "collective node", the pre-processing component 206 may discard the bilingual snippet pairs obtained from the particular bilingual web page so that no additional processing of the bilingual snippet pairs from the particular bilingual web page is performed by the pattern extraction module 114.

However, if the pre-processing component 206 detects the presence of a "collective node" in a particular bilingual web page, the pre-processing component 206 may cause the seed mining component 208, the pattern learning component 210, and/or the data mining component 212 to mine the bilingual data 128 (FIG. 1) from the inner text of the "collective node." Following bilingual data mining, the pre-processing component 206 may remove the mined "collective node" from its node array and proceed to checking the previous node in the node array. The pre-processing component may terminate the checking of the node array once the root node of the DOM tree is reached, at which point the pre-processing component may proceed to the processing of another bilingual web page.

Figure 5:
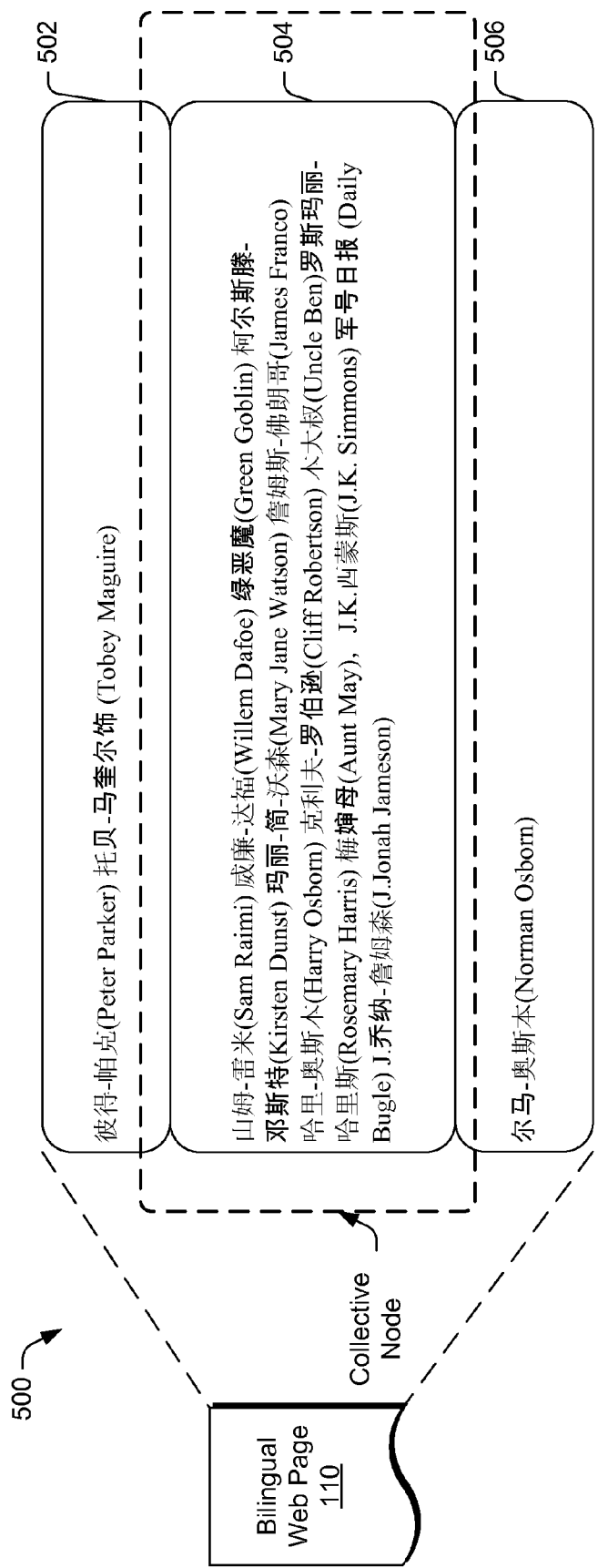
FIG. 5 illustrates the processing of an exemplary node array by the pre-processing component of a pattern extraction module, in accordance with various embodiments.

FIG. 5 illustrates the processing of an exemplary node array 500 by the pre-processing component 206, in accordance with various embodiments. As described above, the node array may be created by a breadth-first search (BFS) algorithm from the Document Objet Model (DOM) tree of a bilingual web page, such as one of the bilingual web pages 110 (FIG. 1). As shown, the exemplary node array 500 may include three nodes 502-506. Each of the nodes 502, 504, and 506 contains inner text that includes bilingual snippet pairs. In at least one embodiment, the pre-processing component 206 may check each the inner text of each of the nodes 502, 504, and 506 in the node array 500 in order (e.g., from node 506 to node 504 to node 502) to ascertain whether at least one of the nodes 502, 504, and 506 is a "collective node."

For example, the minimum number of non-overlapping bilingual snippet pairs in a "collective node" may be 10 pairs and the maximum percentage of other snippets may be 10 percent. Accordingly, the pre-processing component 206 may determine that node 506 is not a "collective node" as it only contains one bilingual snippet pair. However, the pre-processing component 206 may determine that node 504 is a "collective node" as it meets the exemplary requirements (i.e., at least 10 non-overlapping snippet pairs, and no more than 10 percent other snippets). However, the pre-processing component 206 may also determine that node 502 is not a "collective node" as it only contains two bilingual snippet pairs. Thus, the pre-processing component 206 may cause the seed mining component 208, the pattern learning component 210, and/or the data mining component 212 to mine the bilingual data 128 (FIG. 1) from the inner text of the node 504.

Returning to FIG. 2, the seed mining component 208 may be configured to receive an input of a "collective node" whose inner text has been segmented into continuous snippets, such as ... $E_k C_h E_{k+1} C_{h+1}$. The seed mining component 208 may check every bilingual snippet pair of the "collective node" to determine if the bilingual snippet pair is a potential translation pair. In various embodiments, the seed mining component 208 may accomplish the checking of every bilingual snippet pair using an alignment model 214. The alignment model 214 may include both the bilingual dictionary 118 (FIG. 1) and the transliteration model 116 (FIG. 1) to compute the likelihood of a bilingual snippet pair being an actual translation pair.

In the various embodiments of the alignment model 214, the alignment model 214 may enable the seed mining component 208 to express this likelihood in the form of a translation score, where the higher the translation score for a particular bilingual snippet pair, the more likely the particular bilingual snippet pair is an actual translation pair.

In various embodiments, the transliteration model 116 may enable the transcribing of a word or text written in a first language into a second language, so that the original spelling or written representation of the first language may be approximated or reproduced based on the second language. For example, a transliteration model for English and Chinese may facilitate the conversion of the syllables of English words into Chinese Pingyin syllables, which are then converted into Chinese characters. However, it will be appreciated that in other embodiments, the alignment model 214 may make use of transliteration model for a variety of other languages. Likewise, the bilingual dictionary 118 may be for a variety of language in various embodiments.

Thus, the seed mining component 208 may determine that two snippets of a bilingual snippet pair are likely to be translations of each other using the alignment model 214. When this occurs, the bilingual snippet pair may be referred to as a translation snippet pair. However, in some embodiments, when two adjacent bilingual snippet pairs, e.g., $E_k C_h$ and $C_h E_{k+1}$ are both considered to be translation snippet pairs by the seed mining component 208, the seed mining component 208 may designate the translation snippet pair with the lower translation score as an improper pairing, or a non-translation snippet pair.

In various embodiments, the seed mining component 208 may process a bilingual snippet pair from a "collective node" prior to determining whether the bilingual snippet pair is a proper translation snippet pair based on the alignment model 214. In such embodiments, the seed mining component 208 may first isolate the first-language content and the second-language content of the pair from any surrounding context markings (e.g., quotation marks, parentheses) using a simple rule. For example, in the case of (Hello "Hola"), the seed mining component 208 may remove the parenthesis pair ( ) and produce Hello "Hola". The rule states that all characters/letters of the first language snippet, within and including the first and last characters/letters of the first language snippet, are parts of the first language content. Similarly, the rule further states that all of characters of the second language snippet, within and including the first and last characters/letters of the second language snippet, are part of the second language content.

For example, in the instance of an English and Chinese bilingual snippet pair, the seed mining component 208 may regard all characters within (and including) the first and the last English letter in the English snippet of the pair as the English content. Similarly, with respect to the Chinese snippet of the pair, the seed mining component 208 may regard all characters within (and including) the first and the last Chinese character in the snippet as the Chinese content.

In certain embodiments, the seed mining component 208 may segment the language content of each snippet into words following language content isolation. Some language content (e.g., English) may be segmented into words based on the format of the language context (e.g., spaces, returns, etc.). However, the seed mining component 208 may employ specialized algorithms to segment other language content. For example, in the case of Chinese context, the seed mining component 208 may employ a dictionary-based Forward Maximum Matching algorithm to segment the language content.

In further embodiments, the seed mining component 208 may also employ a stemming algorithm to reduce words of particular language content into their root form. For example, in the case of the English, the seed mining component 208 may use a stemming algorithm to stem the word, e.g., "fishing" into "fish".

The seed mining component 208 may also perform stop word filtering on the language contents of the bilingual snippet pairs during pre-processing. Generally, stop words are parts of speech that are recognized to generate noise and reduce the effectiveness of computerized query searches. For example, in the case of English, the seed component 208 may be configured to remove stop words such as "of", "to", "the". However, it will be appreciated that stop words filtering may be performed for a variety of languages. In at least some embodiments, the seed mining component 208 may use a list of stop words, as stored in the data storage module 220, to filter out stop words from language contents.

The implementation of such processing on all the bilingual snippet pairs of a "collective node" by the seed mining component 208 may produce a collection of first language content and a second language content. For example, but not as a limitation, in the case of a "collective node" that includes English and Chinese bilingual snippet pairs, the seed mining component 208 may constitute all English words from the pairs into a English collection E={$w_1, w_2, \ldots, w_m$} and all Chinese words into a Chinese collection C={$c_1, c_2, \ldots, c_n$}, where $w_i$ is an English word, and $c_i$ is a Chinese word.

The seed mining component 208 may then implement a linking algorithm, such as the alignment model 214, which takes both translation and transliteration into consideration to link words in the two collections (i.e., first language content collection and second language content collection) to produce translation snippet pairs.

In various embodiments, the seed mining component 208 may link a word from each collection to form a word pair in three situations. The first is that the two words are considered to be translations of each other in the bilingual dictionary 118. The second is that the pronunciation similarity of the two words exceeds a translation threshold, as indicated by a translation score, so that the words may be considered to be transliterations of each other. The third is that the two words are identical (this rule is applicable to linking numbers or English abbreviations in Chinese snippets).

In such embodiments, the seed mining component 208 may be configured to perform linking so that an overall translation rate for the two collections is maximized. The overall translation rate may be defined as the percentage of words that can be linked in the two collections. For some words in the pairs, there may be multiple translations and/or transliterations. Accordingly, the seed mining component 208 may be configured to link two words so that the pairing produces the highest translation score.

For example, in the instance of a Chinese-English bilingual snippet pair of "Little Smoky River" and "小斯莫基河", the English content may be separated as "Little/Smoky/river", and the Chinese content may be separated as "小/斯/莫/基/河". The seed mining component 208 may consult a dictionary, such as the bilingual dictionary 118 in the alignment model 214, to determine whether the English content and the Chinese content constitute a translation snippet pair. According to the dictionary, the word "Little" may be linked with "小", and the "river" may be linked with "河". And "Smoky" may be translated into the Chinese characters "冒烟的". However, in this example, the seed mining component 208 may determine that "冒烟的" is not present in a Chinese Collection "C" that encompasses the Chinese content.

Thus, the seed mining component 208 may further consult the transliteration model 116 included in the alignment model 214. In turn, the transliteration model 116 may provide one or more possible Chinese transliterations for the English word "Smoky." In particular, the transliteration model 116 may further suggest that the translation score for a particular transliteration of the English word "Smoky", that is, "斯", is higher than a pre-determined likelihood threshold. Accordingly, the seed mining component 208 may determine that the best translation for English content "Little Smoky River" is "小斯莫基河", which matches the Chinese content of the bilingual snippet pair. Thus, the linking algorithm may enable the seed mining component 208 to link the Chinese-English bilingual snippet pair of "Little Smoky River" and "小斯莫基河" into a translation snippet pair.

It will be appreciated that the seed mining component 208 may perform such translation rate maximization for "collective nodes" that contains other language contents. Accordingly, the use of Chinese and English to illustrate the implementation of the linking algorithm is exemplary rather than limiting.

The pattern learning component 210 may receive inputs of translation snippet pairs from a "collection node". In turn, the pattern learning component 210 may replace the language snippets in each of the translation snippet pairs with placeholders. For example, the contents of a Chinese English translation snippet pair may be replaced with the placeholders "[E]" and "[C]", respectively.

The pattern learning component 210 may then merge the snippets of each translation snippet pair into a string and add a starting tag "[#]" and an ending tag "[#]" to its start and end. The pattern learning component 210 may further use the processed strings to build a PAT tree, that is, a form of a Patricia tree. Generally, a PAT tree is a data structure that represents the suffixes of a string in a way that enables complex string search operations. The pattern learning component 210 may then extract all substrings containing the language placeholders (e.g., "[E]" and "[C]") as candidate patterns from the PAT tree. In various, the pattern learning component 210 may remove candidate patterns that start or end with the language placeholders (e.g., "[E]" or "[C]"), since placeholders cannot be used to determine clear boundaries when being matched in a string.

The pattern learning component 210 may be configured to handle typographical errors, or "typos," in the contents of the translation snippet pairs. For example, web page authors often make typos when coding content into HTML web pages, such as when a web page author may mistakenly type a "." (English-format period) instead of a "。" (Chinese-format period), which may result in the pattern learning component 210 recognizing the mistake as a distinct pattern when none is intended. Other examples include multiple spaces between words instead of a single space, multiple punctuation marks instead of a single punctuation mark, and so on. Accordingly, the pattern learning component 210 may implement an algorithm that enhances error-handling ability.

In various embodiments, pattern learning component 210 may enhance implementation of an error-handling algorithm that replaces one or more characters in a candidate pattern with their classes. In at least one embodiment, the pattern learning component 210 may replace three classes of characters: punctuation may be replaced with a placeholder [P], a number may be replaced with a placeholder [N], and a white space may be replaced with a placeholder [S]. In other embodiments, the error-handling algorithm may also merge constituent classes that are identical.

Thus, with the implementation of the error handling algorithm and the building of the PAT tree, the pattern learning component 210 may produce a plurality of candidate patterns for each translation snippet pair.

For example, from the English-Chinese translation snippet pair of "57. Don't worry." and "别担心。", the pattern learning component 210 may produce at least the following candidate patterns: "#[N][P][S][E][P][S][C][P]#", "[N][P][S][E][P][S][C][P]#", "[N][P][S][E][P][S][C][P]" . . . "[S][E][P][S][C][P]", and so on and so forth.

Following the extraction of all the candidate patterns, the pattern learning component 210 may use a Support Vector Machine (SVM) classifier to select the best candidate patterns:

$$f_{\vec{w}}(\vec{x}) = \langle \vec{w}, \vec{x} \rangle$$

Where $\vec{x}$ is the feature vector of a candidate pattern, and $\vec{w}$ is the vector of weights. $\langle \cdot, \cdot \rangle$ stands for an inner product. $f$ is the decision function to decide which candidate patterns are the best fit candidates.

In this SVM model, each candidate pattern $p_i$ may contain at least four features. The features may include a "generality" measure, that is, the percentage of those bilingual snippet pairs which can match $p_i$ in all bilingual snippet pairs. This feature measures if the candidate pattern is a common pattern shared by many translations.

The features may also include an "average translation score", that is, the average translation score of all bilingual snippet pairs which can match $p_i$. This feature may help the pattern learning component 210 to decide if those pairs sharing the same pattern are really translations.

The features may further include a "length" measure, that is, the length of $p_i$. In general, longer patterns are more specific and can produce more accurate translations. The feature may additionally include a "regularity" measure. The "regularity" measure may be the standard deviation of the numbers of noisy snippets. As used herein, "noisy snippets" refer to those snippets between any two adjacent bilingual snippet pairs which can match $p_i$. Thus, if the regularity of a pattern is low, the pattern learning component 210 may determine that translation snippet pairs sharing this pattern have similar inner relationships with each other. In at least one embodiment, the weight vector of the SVM may be derived based on training example bilingual web pages that are labeled by human operators. For example, the weight vector may be estimated based on candidate patterns extracted from 300 bilingual web pages and labeled as either positive or negative.

The data mining component 212 may be configured to extract a translation pair from each bilingual snippet pair based on the one or more best fit candidate patterns selected by the pattern learning component 210. In various embodiments, the data mining component 212 may merge each bilingual snippet pair into a target string. Subsequently, the data mining component 212 may add a starting tag "[#]" and an ending tag "[#]" to each of the target strings. The data mining component 212 may then match each of the best fit candidate patterns to teach of the targets to extract translation pairs.

In at least one embodiment, the data mining component 212 may transform the best fit candidate patterns into standard regular expressions. Accordingly, the data mining component 212 may make use of regular expression matching tools (e.g., Microsoft .NET framework) to extract the translation pairs.

In further embodiments, the data mining component 212 may be configured to make the candidate patterns more robust when transforming them into standard regular expressions. Accordingly, the data mining component 212 may enable each character class to match the bilingual snippet pairs more than once. Thus, in at least one embodiment, the data mining component 212 may transform "[N]", "[P]" and "[S]" of each best fit candidate pattern into "[\d]+", "[\p{P}]+", and "[\s]+", respectively. Likewise, each of "[E]" and "[C]" may be transformed into "[.]+" prior to matching the best fit candidate pattern to bilingual snippet pairs.

For some special cases, a best fit candidate pattern may match more than once in a target string. Accordingly, the data mining component 212 may select the translation pair in the target string with the highest translation score. In various embodiments, the data mining component may employ the alignment model 214 and/or the seed mining component 208 to select the translation pair with the highest score. In an Chinese English example, when matching the best fit pattern "#[E][S][C]#" to the bilingual snippet pair "#spring in 1984 1984 年的春天#", the data mining component 208 may obtain 3 possible translation pairs: (1) "spring" and "in 1984 1984 年的春天"; (2) "spring in" and "1984 1984 年的春天"; and (3) "spring in 1984" and "1984 年的春天". However, based on the translation score obtained for each possible translation pair, the data mining component 212 may select "spring in 1984" and "1984 年的春天" as the proper translation. The extraction of translation pairs based on best fit candidate patterns, as implemented by the data mining component 212, is further illustrated in FIG. 6.

Figure 6:
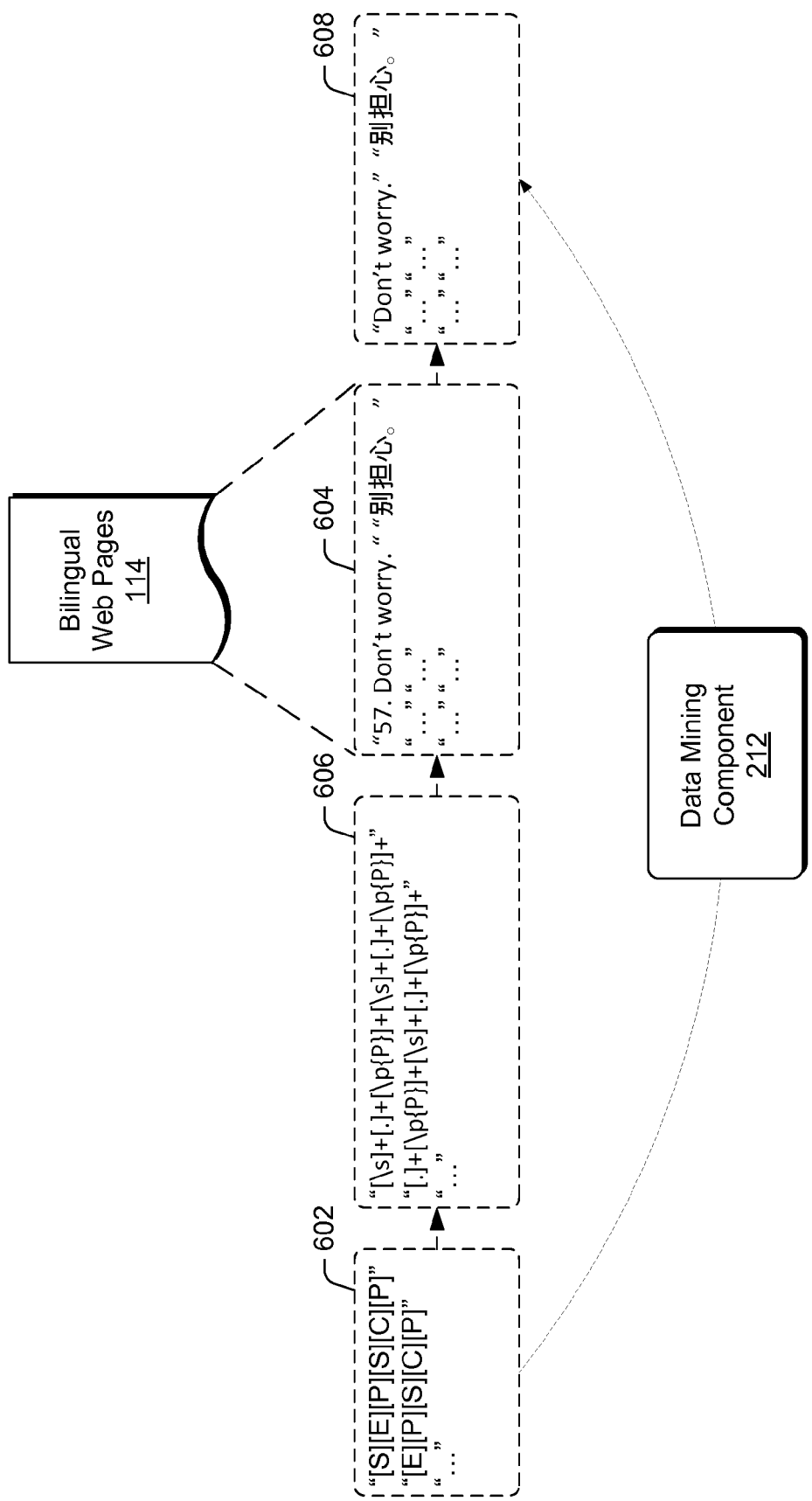
FIG. 6 illustrates an exemplary pattern-based mining by a data mining component of a pattern extraction module, in accordance with various embodiments.

FIG. 6 illustrates an exemplary pattern-based mining by the data mining component 212, in accordance with various embodiments. As shown, the data mining component 212 may match each of the one or more best fit candidate patterns 602 to each of the bilingual snippet pairs 604, such as bilingual snippet pairs from the bilingual web pages 110 (FIG. 1). In various embodiments, the data mining component 212 may implement such match by transforming the one or more best fit candidate patterns into standard regular expressions 606. By using the standard regular expressions 606, the data mining component 212 may extract translation pairs 608 from the bilingual snippet pairs 604. In further embodiments, the data mining component 212 may further use the data storage module 220 to pass the translation pairs 608 to a bilingual dictionary 118 (FIG. 1). In other embodiments, the translation pairs 608 may be provided back to the search engine 108 (FIG. 1) to obtain additional bilingual web pages 110.

The search engine module 216 may provide a web search engine, such as the search engine 108. In various embodiments, the web search engine module 216 may include an application interface that enables module 216 to conduct searches via an existing publicly available web search engine (e.g., Live Search provided by the Microsoft Corporation of Redmond, Wash., Google of Mountain View, Calif., Yahoo! Search provided by Yahoo! of Sunnyvale, Calif., etc.). In other embodiments, the search engine module 216 may be configured to provide a custom web search engine.

The user interface module 218 may interact with a user via a user interface (not shown). The user interface may include a data output device such as a display, and one or more data input devices. The data input devices may include, but are not limited to, combinations of one or more of keypads, keyboards, mouse devices, touch screens, microphones, speech recognition packages, and any other suitable devices or other electronic/software selection methods.

The user interface module 218 may enable a user to provide input to the search engine module 216 that includes a search term (e.g., seed translation pair), and/or trigger words to be used with the search term. Additionally, the user interface module 218 may further cause the display to present translation results, as extracted by the pattern extraction module 114, to the user.

The data storage module 220 may be configured to store data in a portion of memory 204 (e.g., a database). In various embodiments, the data storage module 220 may be configured to store downloaded web pages 124, as well as DOM trees, bilingual snippet pairs, translation snippet pairs, candidate patterns, translation and transliteration data for the alignment model 214, and training data for the data mining component 212. The data storage module 220 may also be configured to store any additional data derived from the downloaded web pages 124, such as any intermediary data produced by the pattern extraction module 114.

Exemplary Process

Figure 7:
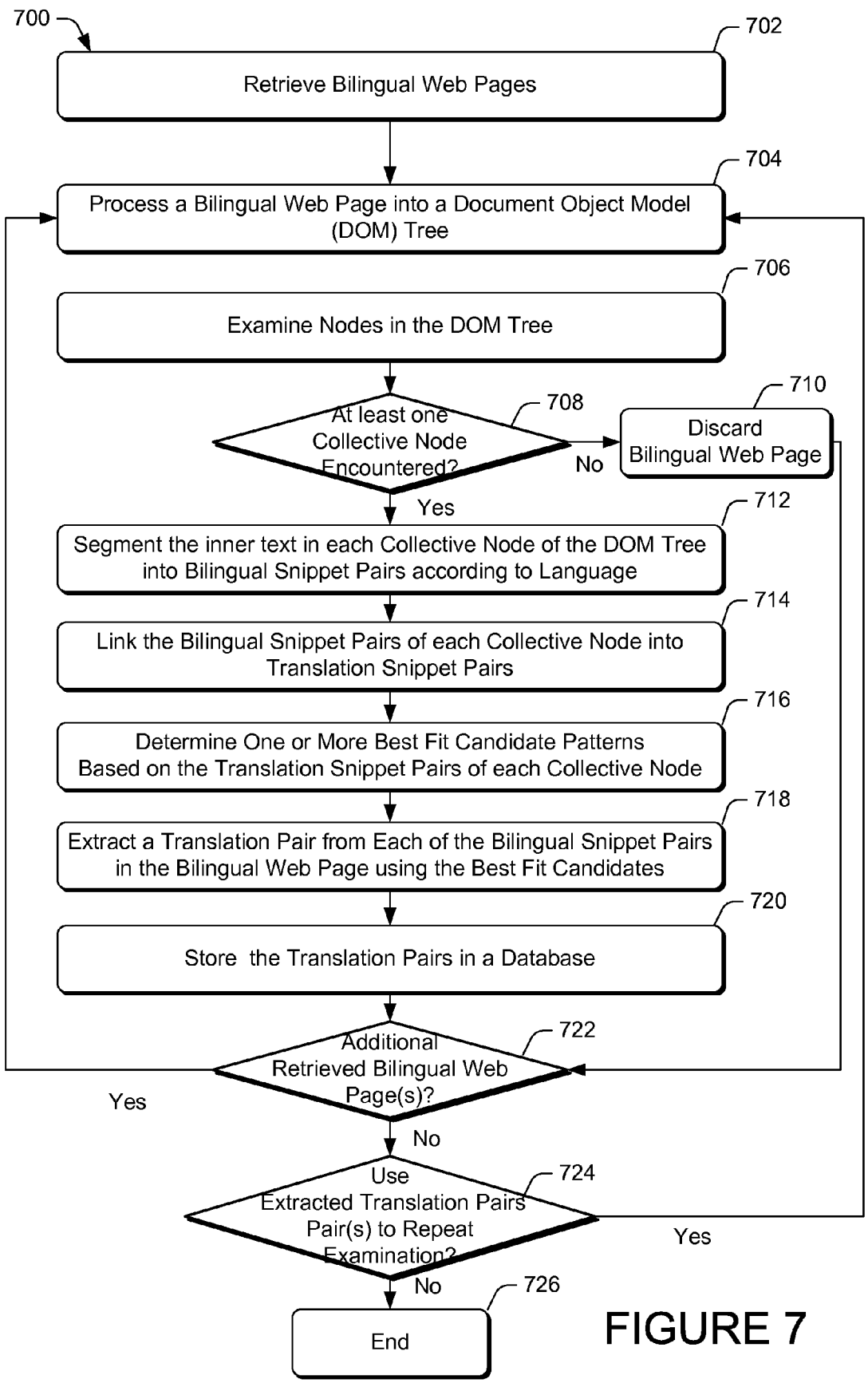
FIG. 7 shows a flow diagram illustrating an exemplary process that facilitates adaptive pattern learning for bilingual data mining, in accordance with various embodiments.

FIG. 7 shows a flow diagram illustrating an exemplary process 700 that facilitates adaptive pattern learning for bilingual data mining, in accordance with various embodiments. The exemplary process 700 in FIG. 7 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to the exemplary computing device 102 of FIG. 1, although it may be implemented in other system architectures.

At block 702, the computing device 102 may retrieve one or more bilingual web pages from the Web. In some embodiments, the computing device 102 may download pre-selected bilingual web pages. In at least one embodiment, the computing device 102 may download web pages from one or more web sites that are known to generally have bilingual content (e.g., international new media web sites, entertainment sites, etc.). In other embodiments, the computing device 102 may use the search engine 108 to automatically download web pages from web sites have a particular country code top level domain (e.g., .cn, .jp, .kr, etc.), as predominately non-English web sites.

In still other embodiments, the search engine 108 may retrieve one or more bilingual web pages from the Web using a translation search term. The translation term search may be implemented via the search engine 108 using a search term. In some embodiments, the search term may be in a first language that is to be translated to a second language. In other embodiments, the search term may be a translation pair that includes a first word or phrase in a first language, and a second word or phrase that is a suspected translation in a second language for the first term. In additional embodiments, the translation term search may be implemented on the search engine 108 using a combination of the search term with trigger words. The trigger words may include words that specifically trigger the search engine 108 to retrieve bilingual web pages that include the search term.

At block 704, the pattern extraction module 114 of the computing device 102 may process a downloaded bilingual web page into a Document Object Model (DOM) tree. In various embodiments, the pre-processing component 206 may remove nodes having attribute information and connect the children content nodes of the attribute nodes directly to one or more parent nodes (e.g., root node).

At block 706, the pattern extraction module 114 may examine the nodes of the DOM that are associated with the bilingual web page being processed. Through this examination, the pre-processing component may eliminate bilingual web pages that contain nodes with insufficient pairs of bilingual snippets.

In various embodiments, the pattern extraction module 114 may determine whether the DOM tree includes at least one "collective node". A "collective node" may be a node of the DOM tree whose inner text contains a minimum number of non-overlapping bilingual snippet pairs and less than a maximum percentage of other snippets that do not belong to any bilingual snippet pairs. In at least one embodiment, the minimum number of non-overlapping bilingual snippet pairs may be 10 pairs and the maximum percentage of other snippets may be 10 percent. However, it will be appreciated that the minimum number of non-overlapping bilingual snippet pairs and/or the maximum percentage of snippets that defines a "collective node" may vary in other embodiments.

At decision block 708, the pattern extraction module 114 may determine whether at least one "collective node" is present in the DOM tree of the associated bilingual web page. If the pattern extraction module 114 determines that no "collective nodes" are present in the DOM tree ("no" at decision block 708), the process 700 may proceed to block 710. At block 710, the bilingual web page associated with the DOM tree may be discarded. Further, the process 700 may then proceed to block 722.

However if the pattern extraction module 114 determines that at least one "collective node" is present in the associated bilingual web page, the process 700 may proceed to block 712.

At block 712, the pattern extraction module 114 may further segment the inner text in each node of the DOM tree into a list of text snippets according to language. For example, in the instance where the bilingual input web page includes English and Chinese, each of the snippets in each node may be labeled as either an English snippet, or a Chinese snippet. The pattern extraction module 114 may further designate each snippet according to its language. For example, in the instance where the inner text of a node includes Chinese and English snippets, the snippets may be alternatively labeled as "E" for the English snippet, and "C" for the Chinese snippet. The pattern extraction module 114 may then pair each first language text snippet with an adjacent corresponding second language snippet to form bilingual snippet pairs.

At block 714, the pattern extraction module 114 may check every bilingual snippet pair of each "collective node" to determine if the bilingual snippet pair may be linked into a translation snippet pair. In various embodiments, the seed mining component 208 may accomplish the checking of every bilingual snippet pair using an alignment model 214. The alignment model 214 may include both the bilingual dictionary 118 and the transliteration model 116. In further embodiments, the pattern extraction module 114 may perform at least one of word segmentation, word stemming, or word filtering to facilitate the linking of the bilingual snippet pairs into translation snippet pairs.

In such embodiments, the pattern extraction module 114 may perform linking so that an overall translation rate for the bilingual snippet pairs in the "collective node" is maximized.

At block 716, the pattern extraction module 114 may determine one or more best fit candidate patterns based on the linked translation snippet pairs of the one or more "collective nodes" associated with the bilingual web page. In various embodiments, the pattern extraction module 114 may use a Support Vector Machine (SVM) classifier to select the best candidate patterns. The SVM classifier may be configured to take at least four features into account when selecting the best candidate patterns. The features may include a "generality" measure that ascertains if the candidate pattern is a common pattern shared by many translations, and an "average translation score" that may help the pattern extraction module 114 to determine if snippet pairs sharing the same pattern are really translations. The features may further include a "length" measure that uses length as a measurement of translation accuracy. The feature may additionally include a "regularity" measure that provides the standard deviation of the numbers of noisy snippets.

At block 718, the pattern extraction module 114 may extract a translation pair from each bilingual snippet pair in the bilingual web page using the best fit candidate patterns. In various embodiments, the pattern extraction module 114 may extract the translation pairs by forming the bilingual snippets into target strings and the one or more best fit candidate patterns into standard regular expressions. Accordingly, the pattern extraction module 114 may extract the translation pairs by matching the one or more standard regular expressions to the target strings. In various embodiments, the translation pairs may include term translations, sentence translations, and/or combinations thereof.

At block 720, the pattern extraction module 114 may use the data storage module 110 to store the bilingual data 128 (FIG. 1), in the form of translation pairs, into a database. In at least one embodiment, the database may be the bilingual dictionary 118 included in the alignment model 214. In various embodiments, at least one of the translation pairs stored in the data storage module 110 may be fed back into search engine 108 to retrieve additional bilingual web pages that include the at least one translation pair.

In further embodiments, the data storage module 220 may enable the retrieval of the one or more stored translation pairs via the user interface module 218 (FIG. 2) so that the bilingual data may be presented to a user through a user interface.

At decision block 722, the pattern extraction module 114 may determine whether there are one or more additional retrieved bilingual web pages to be processed for obtaining further translation pairs. If the pattern extraction module 114 determines there are additional bilingual web pages to be processed ("yes") at decision block 722, the process 700 may loop back to block 704, where an additional bilingual web page may be processed.

However, if the pattern extraction module 114 determines there are no additional bilingual web pages to be processed ("no" at decision block 722), the process 700 may continue to decision block 724.

At decision block 724, the pattern extraction module 114 may determine whether the alignment model 214, which now includes the extracted translation pairs in its bilingual dictionary 118, should be used to recursively repeat the examination of the one or more DOM trees of the corresponding bilingual web pages. In various embodiments, the decision to seed a new retrieval may be based on whether a predetermined number of recursive cycles have been met.

If the pattern extraction module 114 determines that a new examination of the one or more DOM trees should be performed ("yes" at decision block 724), the process 700 may loop back to block 704, where one of the retrieved bilingual web pages may be once again processed into a DOM tree. However, if the pattern extraction module 114 determines that no new retrieval should be performed ("no" at decision block 722), the process 700 may terminate at block 726.

Exemplary Computing Environment

Figure 8:
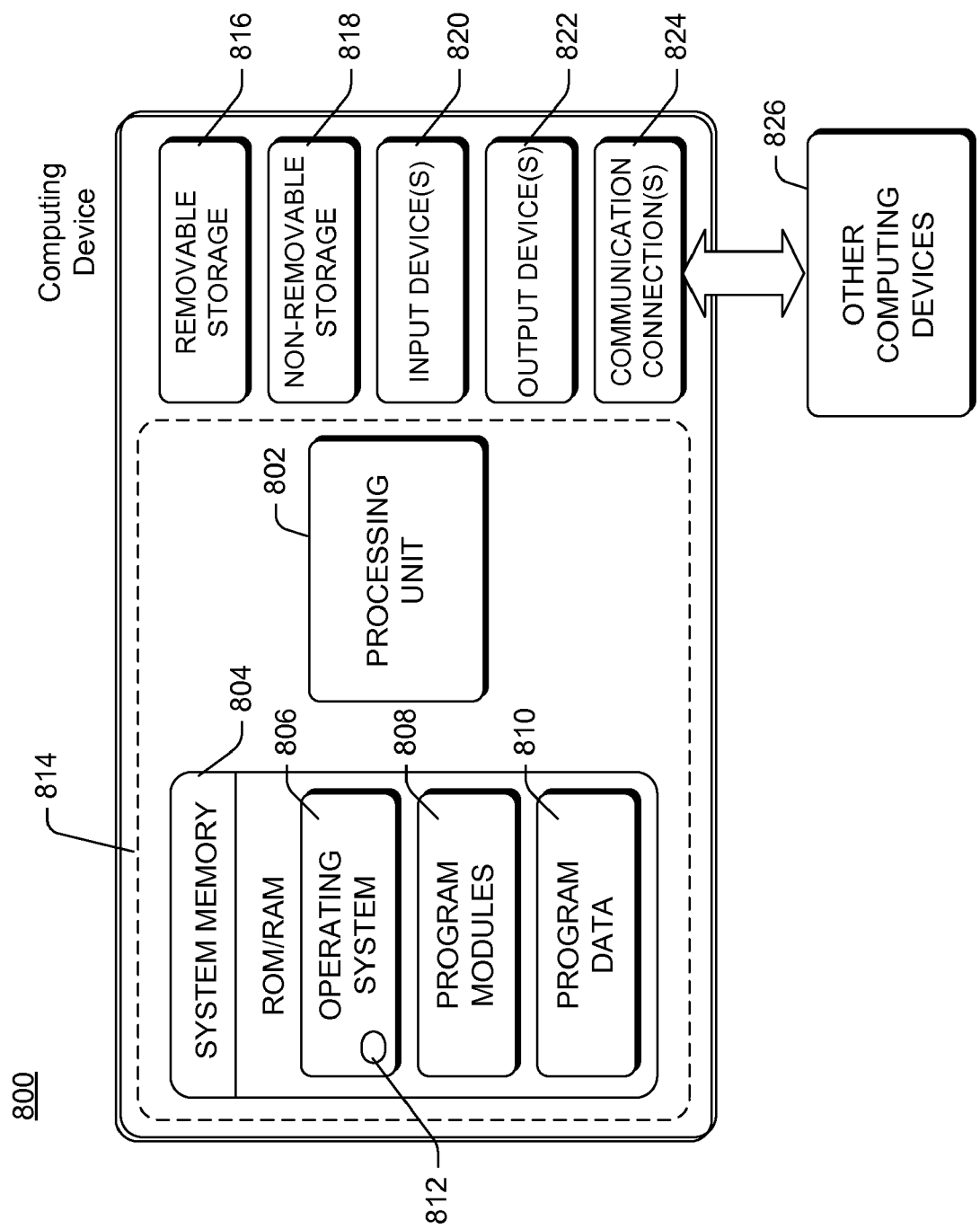
FIG. 8 illustrates a representative computing system that is used to implement techniques and mechanisms for adaptively learning translation layout patterns of bilingual web pages for the extraction of bilingual translation pairs.

FIG. 8 illustrates a representative computing system 800 that is used to implement techniques and mechanisms for adaptively learning translation layout patterns of bilingual web pages for the extraction of bilingual translation pairs. The computing device 102, as described in FIG. 1, may be implemented using the computing system 800. However, it will readily appreciate that the techniques and mechanisms may be implemented in other computing devices, systems, and environments. The computing system 800 shown in FIG. 8 is only one example of a computing device and is not intended to suggest any limitation as to the scope of use or functionality of the computer and network architectures. Neither should the computing system 800 be interpreted as having any dependency or requirement relating to any one or combination of components illustrated in the example computing device.

In a very basic configuration, Computing system 800 typically includes at least one processing unit 802 and system memory 804. Depending on the exact configuration and type of computing device, system memory 804 may be volatile (such as RAM), non-volatile (such as ROM, flash memory, etc.) or some combination of the two. System memory 804 typically includes an operating system 806, one or more program modules 808, and may include program data 810. The operating system 806 includes a component-based framework 812 that supports components (including properties and events), objects, inheritance, polymorphism, reflection, and provides an object-oriented component-based application programming interface (API), such as, but by no means limited to, that of the .NET™ Framework manufactured by the Microsoft Corporation, Redmond, Wash. The device 800 is of a very basic configuration demarcated by a dashed line 814. Again, a terminal may have fewer components but will interact with a computing device that may have such a basic configuration.

Computing system 800 may have additional features or functionality. For example, computing system 800 may also include additional data storage devices (removable and/or non-removable) such as, for example, magnetic disks, optical disks, or tape. Such additional storage is illustrated in FIG. 8 by removable storage 816 and non-removable storage 818. Computer storage media may include volatile and nonvolatile, removable and non-removable media implemented in any method or technology for storage of information, such as computer readable instructions, data structures, program modules, or other data. System memory 804, removable storage 816 and non-removable storage 818 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by Computing system 800. Any such computer storage media may be part of device 800. Computing system 800 may also have input device(s) 820 such as keyboard, mouse, pen, voice input device, touch input device, etc. Output device(s) 822 such as a display, speakers, printer, etc. may also be included. These devices are well known in the art and are not discussed at length here.

Computing system 800 may also contain communication connections 824 that allow the device to communicate with other computing devices 826, such as over a network. These networks may include wired networks as well as wireless networks. Communication connections 824 are some examples of communication media. Communication media may typically be embodied by computer readable instructions, data structures, program modules, etc.

It is appreciated that the illustrated computing system 800 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The ability to adaptively learns bilingual data layout patterns may provide the ability to extract bilingual translations from a variety of bilingual web pages regardless of the of layout patterns employed, and eliminate the need to manually determine and define pattern rules. Thus, embodiments in accordance with this disclosure may improve the efficiency of translation extraction from bilingual web pages.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A system, comprising:
one or more processors; and
memory that includes a plurality of computer-executable components executable by the one or more processors, the plurality of computer-executable components comprising:
a pre-processing component to process a bilingual web page into a Document Object Model (DOM) tree that includes at least one node;
a seed mining component to link bilingual snippet pairs of the at least one node into a plurality of translation snippet pairs;
a pattern learning component to determine one or more best fit candidate patterns based on the plurality of translation snippet pairs via a Support Vector Machine (SVM) classifier;
a data mining component to mine one or more translation pairs from the bilingual web page using the one or more best fit candidate patterns; and
a data storage component to store the one or more translation pairs, wherein the one or more translation pairs including at least one of a term pair, a phrase pair, or a sentence pair.

2. The system of claim 1, wherein the pre-processing component is to further remove attribute nodes and link together content nodes of the DOM tree.

3. The system of claim 1, wherein the pre-processing component is to further generate the plurality of translation snippet pairs from inner text of the at least one node based on Unicode values of the inner text.

4. The system of claim 1, wherein the pre-processing component is to further determine whether the at least one node is a collective node, whether a percentage of snippets that do not belong to bilingual snippet pairs in the collective node does not exceed a maximum percentage, and whether the collective node includes a minimum number of non-overlapping bilingual snippet pairs.

5. The system of claim 1, wherein the seed mining component is to link bilingual snippet pairs of the at least one node into the plurality of translation snippet pairs using a bilingual dictionary or a transliteration model.

6. The system of claim 1, wherein the seed mining component is to link bilingual snippet pairs of the at least one node into the plurality of translation snippet pairs via segmenting language content of each snippet in each bilingual snippet pair into words.

7. The system of claim 1, wherein the seed mining component is to link bilingual snippet pairs of the at least one node into the plurality translation snippet pairs via at least one of stemming one or more words in each bilingual snippet pair or removing one or more stop words from each bilingual snippet pair.

8. The system of claim 1, wherein the seed mining component is to link bilingual snippet pairs of the at least one node into the plurality of translation snippet pairs by:
forming the bilingual snippet pairs into a first language collection and a second language collection, and
linking the first language and the second language collection to maximize an overall translation rate between the first language collection and the second language collection.

9. The system of claim 1, wherein the pattern learning component is to determine the one or more best fit candidate patterns by:
merging each translation snippet pair into a string, and forming one or more candidate patterns based on the strings using a PAT tree, and
selecting the one or more best fit candidate patterns from the one or more candidate patterns using the SVM classifier.

10. The system of claim 1, wherein the SVM classifier is to incorporate at least a generality measure feature, an average translation score feature, a length measure feature, and a regularity measure feature when determining the one or more best fit candidate patterns from the plurality of the translation snippet pairs.

11. The system of claim 1, data mining component is to mine one or more translation pairs from the bilingual web page by:
merging each bilingual snippet pair of the one or more nodes in the bilingual web page into a string;
transforming each of the one or more best fit candidate patterns into a standard regular expression; and
matching the one or more standard regular expressions with the strings to derive translation pairs.

12. The system of claim 1, further comprising a search engine component to retrieve one or more bilingual web pages, wherein the search engine component is to retrieve the one or more bilingual web pages via a query based on at least one of a search term or one or more trigger words, or via downloading from a web site having a particular top domain.

13. A method, comprising:
processing a bilingual web page into a Document Object Model (DOM) tree that includes at least one node;
linking bilingual snippet pairs of the at least one node into a plurality of translation snippet pairs using an alignment model, the alignment model including a bilingual dictionary or a transliteration model;
determining one or more best fit candidate patterns based on the plurality of translation snippet pairs via a Support Vector Machine (SVM) classifier;
mining one or more translation pairs from the bilingual web page using the one or more best fit candidate patterns; and
storing the one or more translation pairs into the alignment model, wherein the one or more translation pairs including at least one of a term pair, a phrase pair, or a sentence pair.

14. The method of claim 13, further comprising re-linking the bilingual snippet pairs of the at least one node into the plurality of translation snippet pairs using the alignment model that includes the one or more mined translation pairs.

15. The method of claim 13, wherein the processing includes generating the plurality of translation snippet pairs from inner text of the at least one node based on Unicode values of the inner text.

16. The method of claim 13, wherein the processing includes processing a bilingual web page into a Document Object Model (DOM) tree that includes at least one collective node by determining that a percentage of snippets that do not belong to the bilingual snippet pairs in the at least one node does not exceed a maximum percentage, and the at least one node includes a minimum number of non-overlapping bilingual snippet pairs.

17. The method of claim 13, wherein the linking includes:
segmenting language content in each bilingual snippet pair into words, the language content including of first language snippet and a second language snippet;

reducing the language content of each bilingual snippet pair by stemming one or more words in each bilingual snippet pair or removing one or more stop words from each bilingual snippet pair; and linking the first language snippet and the second language snippet of the bilingual snippet pairs based on the alignment model to generate translation snippet pairs.

18. The method of claim 13, wherein the determining includes merging each translation snippet pair into a string, and forming one or more candidate patterns based on the strings using a PAT tree, and selecting the one or more best fit candidate patterns from the one or more candidate patterns using the SVM classifier.

19. The method of claim 13, wherein the mining includes:

merging each bilingual snippet pair of the one or more nodes in the bilingual web page into a string;

transforming each of the one or more best fit candidate patterns into a standard regular expression; and matching the one or more standard regular expressions with the strings to derive translation pairs.

20. A computer readable storage device storing computer-executable instructions that, when executed, cause one or more processors to perform acts comprising:

processing a bilingual web page into a Document Object Model (DOM) tree that includes and at least one attribute node and at least one content node that is a child of the at least one attribute node;

removing the at least one attribute node from the DOM tree and linking the at least one content node to a root node of the DOM tree;

linking bilingual snippet pairs of the at least one content node into a plurality of translation snippet pairs using an alignment model;

determining one or more best fit candidate patterns based on the plurality of translation snippet pairs via a Support Vector Machine (SVM) classifier;

mining one or more translation pairs from the bilingual web page using the one or more best fit candidate patterns;

storing the one or more translation pairs into the alignment model, wherein the one or more translation pairs including at least one of a term pair, a phrase pair, or a sentence pair; and re-linking the bilingual snippet pairs of the at least one node into the plurality of translation snippet pairs using the alignment model that includes the one or more mined translation pairs.

* * * * *